Oct. 5, 1954     T. W. BOYNES     2,690,928
WINDSHIELD COVER
Filed Aug. 4, 1952
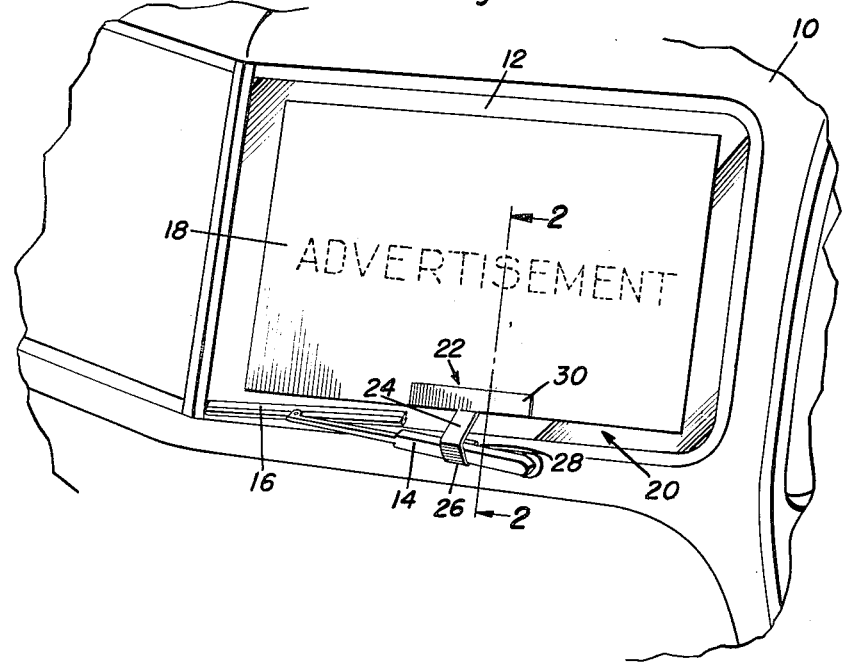
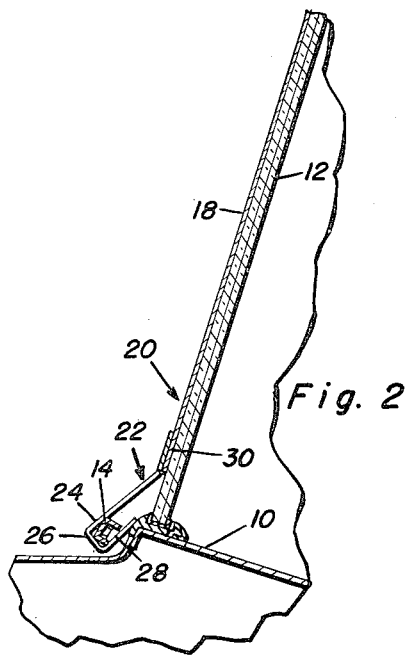
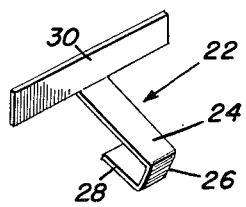
Thomas W. Boynes
INVENTOR.

Patented Oct. 5, 1954

2,690,928

UNITED STATES PATENT OFFICE 2,690,928

WINDSHIELD COVER

Thomas W. Boynes, Coraopolis, Pa., assignor of fifty per cent to Robert D. Jones, Imperial, Pa.

Application August 4, 1952, Serial No. 302,589

2 Claims. (Cl. 296—95)

This invention relates in general to cover elements, and more specifically to a protective cover which may be positioned over the outer surface of a windshield.

The primary object of this invention is to provide an improved protective cover for windshields of vehicles and the like which may be utilized to protect the windshield against accumulation thereon of sleet, ice, snow, mud, etc. during periods when vision through the windshield is not required.

Another object of this invention is to provide an improved windshield protector which is of a relatively simple construction whereby the same may be quickly and easily formed so as to be economically feasible.

Another object of this invention is to provide an improved windshield protector which is provided with relatively simple attaching means whereby the windshield protector may be quickly and easily removed from or positioned on the outer surface of a windshield in a windshield protecting position.

Another object of this invention is to provide an improved windshield protector which may be conveniently stored and may be used a plurality of times without replacing elements thereof.

A further object of this invention is to provide an improved windshield protector which includes a panel overlying said windshield, said panel being formed of a relatively inexpensive material and having imprinted thereon indicia in the form of advertisements whereby users of the same will be constantly reminded of a product which is set forth in the advertisement.

A still further object of this invention is to provide an improved windshield protector which may be attached to windshields of conventional vehicles without requiring the use of additional fasteners and the like which would mar the finish of the vehicle surrounding the windshield.

With these objects definitely in view, this invention resides in certain novel features of construction, combination and arrangement of elements and portions as will be hereinafter described in detail in the specification, particularly pointed out in the appended claims, and illustrated in the accompanying drawings which form a material part of this specification, and in which:

Figure 1 is a fragmentary perspective view of a front portion of a conventional motor vehicle and shows one section of the windshield thereof being protected by the windshield protector which is the subject of this invention;

Figure 2 is an enlarged fragmentary transverse vertical sectional view taken substantially upon the plane indicated by the section line 2—2 of Figure 1 and shows the relationship of the windshield protector with respect to the windshield and the manner in which a clamp portion thereof is attached to a windshield wiper arm for retaining the windshield protector in position; and, Figure 3 is an enlarged perspective view of a clamp for retaining a windshield protecting panel in position, said clamp being engageable with a windshield wiper arm adjacent the windshield to which the panel is attached.

Similar characters of reference designate similar or identical elements and portions throughout the specification and throughout the different views of the drawings.

The average driver of motor vehicles and the like oftentimes enters his vehicle and discovers that he cannot properly see through the windshield thereof due to the blocking of his vision by ice, snow, sleet, mud, etc. which has accumulated on the outer surface of the windshield while the vehicle has been remaining stationary. In such cases it is necessary that the movement of the vehicle be delayed until the driver of the same has properly cleared the windshield of the vision blocking material. Therefore, it is desired that there be provided a simplified windshield protector which may be quickly and easily secured to and removed from a position overlying the outer surface of the windshield.

Referring now to Figures 1 and 2 in particular, it will be seen that there is illustrated a front portion of a body 10 of a conventional vehicle in the area of the windshield thereof and that there is illustrated a windshield section 12 mounted in the body 10. The body 10 is also provided with a windshield wiper for the windshield section 12, the windshield wiper including a wiper arm 14 which has secured to the outer end thereof a wiper blade 16, the wiper blade being adapted to travel over the other surface of the windshield section 12 in order to cleanse the same. It will be understood that the windshield construction and the relationship of the windshield wiper thereto is conventional and is not a part of this invention.

It will be seen that the windshield section 12 is protected against the accumulation of ice, sleet, snow, etc. when the vehicle is parked due to the presence of a protecting panel 18 which is in overlying relation to the outer surface of the windshield section 12. The panel 18 is preferably formed of a cheap material such as cardboard or the like although it may be formed of plastic, metal, etc. It will be noted that the panel 18 is generally rectangular in outline and that it covers a major portion of the outer surface of the windshield section 12. It will be understood that the panel 18 is of a design where it may be utilized with a plurality of different shapes of windshield sections. If it is so desired, the panel 18 may be formed to have the same configuration as the exposed portion of the windshield section 12 in order that the entire outer surface of the same may be protected.

It is intended that the panel 18 be formed of a relatively flexible material whereby the same will conform to the general configuration of the windshield section 12 in the event that it is curved. It is also intended that the panel 18 have imprinted thereon indicia of an advertisement nature in order that the user of the windshield protector, which is the subject of this invention, may be regularly reminded of a certain product which is being advertised on the panel 18. By providing the panel 18 with indicia of an advertisement nature, it will be seen that the windshield protector may be either given away or sold at a reduced cost with the advertiser contributing towards the initial cost of the windshield protector.

In order that the panel 18 may be retained in position with respect to the windshield section 12, the windshield protector, which is referred to in general by the reference numeral 20, also includes an attaching clip which is referred to in general by the reference numeral 22. Referring now to Figure 3 in particular, it will be seen that the attaching clip includes a J-shaped portion formed of a flat strip of metal and including an elongated vertical leg 24 which has integral therewith a transverse base portion 26 and a return leg 28, the leg 28 being much shorter than the elongated leg 24.

In order that the attaching clip 22 may be conveniently secured to the panel 18, the upper end of the elongated leg 24 has connected thereto a transversely extending attachment plate 30 which is formed of a flat strip of metal. It will be noted that the plane of the attachment plate 30 is disposed at an angle to the plane of the elongated leg 24 whereby the panel 18 is properly positioned when the hook portion of the J-shaped hook is positioned over the windshield wiper arm 14.

Inasmuch as the windshield wiper arm 14 is in divergent relation with respect to the windshield section 12, the bottom portion of the panel 18 may be tightly clamped against the outer surface of the windshield section 12 by engagement of the clip 22 with the windshield wiper arm 14. It will be seen that the windshield protector 20 is positioned by sliding the clip 22 along the windshield wiper arm 24 until the hook portion thereof is clamped in the position illustrated in Figure 2.

Inasmuch as the clip 22 is of a relatively simple construction and the panel 18 is relatively inexpensive, it will be seen that the two articles may be formed at a relatively low cost. Furthermore, the attachment plate 30 may be conveniently attached to the panel 18 by any conventional fastening means so that the attachment of the panel 18 to the clip 22 is also relatively inexpensive.

When it is desired to utilize the windshield protector 20, the panel 18 is placed into overlying relation with respect to the outer surface of the windshield section 12 and the clip 22 moved into engagement with the windshield wiper arm 14. When it is desired to remove the windshield protector, the procedure is reversed. Inasmuch as the panel 18 is flat and the clip 22 is relatively small in size and lies substantially within the plane of the panel 18, it will be seen that the windshield protector 20 may be conveniently stored under the front seat of a conventional vehicle.

The operation of this device will be understood from the foregoing description of the details thereof, taken in connection with the above recited objects and drawings. Further description would appear to be unnecessary.

Minor modifications of the device, varying in minor details from the embodiment of the device illustrated and described here, may be resorted to without departure from the spirit and scope of this invention, as defined in the appended claims.

Having thus described the invention, what is claimed as new is:

1. A windshield protector comprising a panel adapted to overlie an outer surface of a windshield, clamp means carried by said panel for engagement with a windshield wiper arm for retaining said panel in position, said clamp means being of a J-shaped configuration and having a transverse attachment plate at one end thereof.

2. A windshield protector comprising an indicia bearing panel adapted to overlie an outer surface of a windshield, clamp means carried by said panel for engagement with a windshield wiper arm for retaining said panel in position, said clamp means including a J-shaped hook formed of flat material, said hook having a flat transverse attachment plate at the upper end thereof attaching said hook to said panel.

References Cited in the file of this patent

UNITED STATES PATENTS

| Number | Name | Date |
| --- | --- | --- |
| 992,233 | Myers | May 16, 1911 |
| 1,508,046 | Barreson | Sept. 9, 1924 |
| 1,599,812 | Ellis | Sept. 14, 1926 |
| 1,919,236 | Lunsford | July 25, 1933 |
| 2,341,236 | Parkins | Feb. 8, 1944 |
| 2,489,901 | Kocinski | Nov. 29, 1949 |
| 2,501,013 | St. Peter | Mar. 21, 1950 |